United States Patent [19]

Waugh et al.

[11] Patent Number: 4,615,754
[45] Date of Patent: Oct. 7, 1986

[54] SUBSTRATELESS DECORATIVE EMBLEM AND METHOD OF MAKING

[75] Inventors: Robert E. Waugh, Sun City Center, Fla.; Urban R. Nannig, North Kingstown, R.I.; Clyde R. Rockwood, Columbus, Ohio

[73] Assignee: The D. L. Auld Company, Columbus, Ohio

[21] Appl. No.: 744,128

[22] Filed: Jun. 12, 1985

[51] Int. Cl.⁴ .............................................. B60R 13/04
[52] U.S. Cl. ..................... 156/242; 156/247; 156/249; 264/130; 264/131; 264/132
[58] Field of Search .............. 156/242, 247, 249; 264/130, 131, 132

[56] References Cited

U.S. PATENT DOCUMENTS

| 1,693,561 | 11/1928 | Klein | 427/282 |
|---|---|---|---|
| 2,021,961 | 11/1935 | MacFarlane | 264/130 |
| 2,354,857 | 8/1944 | Gits et al. | 428/187 X |
| 2,376,305 | 5/1945 | Bauer | 428/187 X |
| 3,235,396 | 2/1966 | Haberlin | 428/40 |
| 3,964,906 | 6/1976 | Kenney | 427/54 X |
| 3,974,311 | 8/1976 | Cherrin | 428/43 |
| 4,100,010 | 7/1978 | Waugh | 428/64 X |
| 4,135,033 | 1/1979 | Lawton | 428/442 X |
| 4,210,693 | 7/1980 | Regan et al. | 428/162 X |
| 4,259,388 | 3/1981 | Reed | 428/28 X |
| 4,331,704 | 5/1982 | Watson, Jr. et al. | 427/54.1 |
| 4,332,074 | 6/1982 | Auld et al. | 264/132 X |
| 4,351,686 | 9/1982 | Clark | 428/448 X |
| 4,356,617 | 11/1982 | Coscia | 264/132 X |
| 4,409,264 | 10/1983 | Gilleo et al. | 428/156 X |
| 4,446,179 | 5/1984 | Waugh | 428/31 |
| 4,460,429 | 7/1984 | Coscia et al. | 156/219 X |
| 4,481,160 | 11/1984 | Bree | 428/13 X |

Primary Examiner—Henry F. Epstein
Attorney, Agent, or Firm—Killworth, Gottman, Hagan & Schaeff

[57] ABSTRACT

A decorative emblem and method of manufacture are provided. The emblem includes a plastic cap overlying a printed and/or decorated upper surface of an adhesive layer. The need for an intermediate metal, plastic, or paper substrate is eliminated. By treating the upper surface of the adhesive to render it tack free, the printing and/or decoration may be applied to that surface and the cap formed directly thereon.

18 Claims, 5 Drawing Figures

U.S. Patent  Oct. 7, 1986  4,615,754
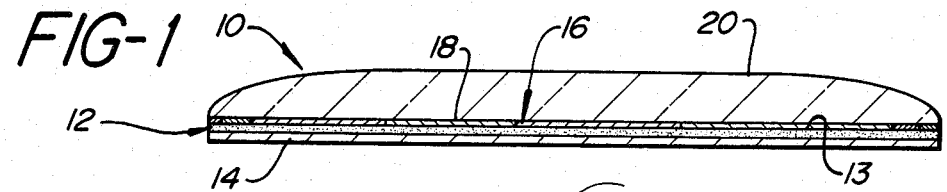
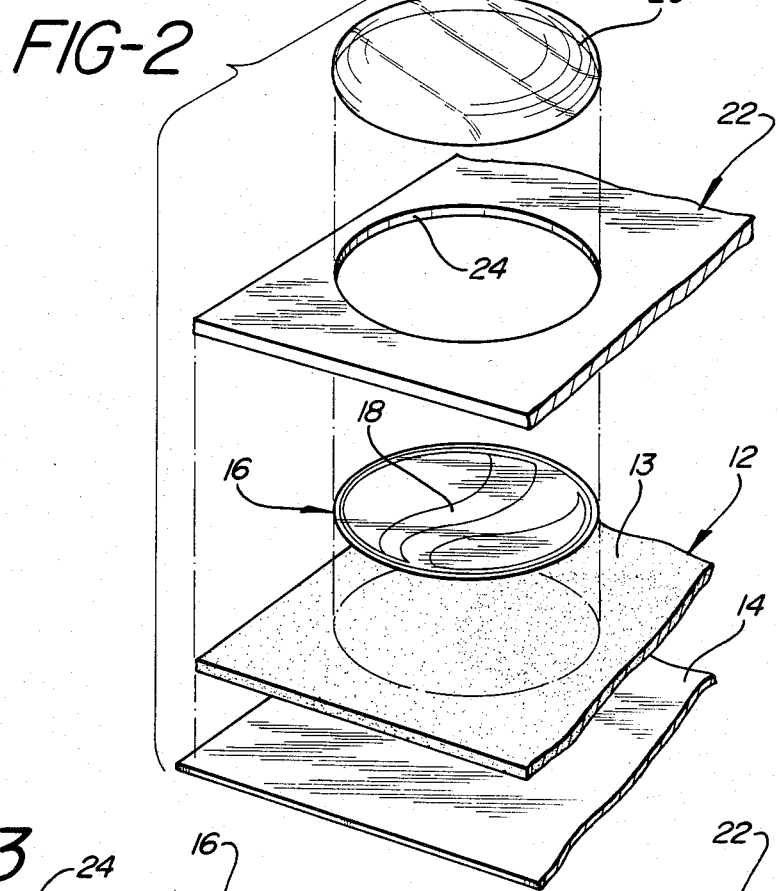
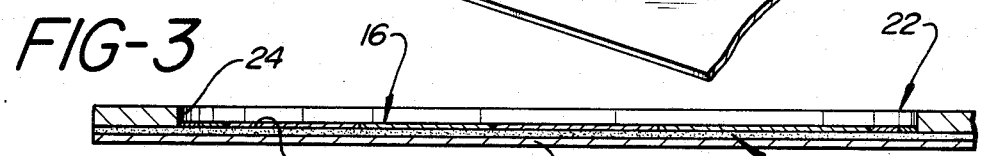
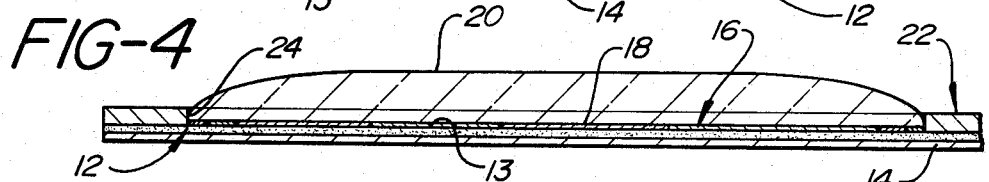
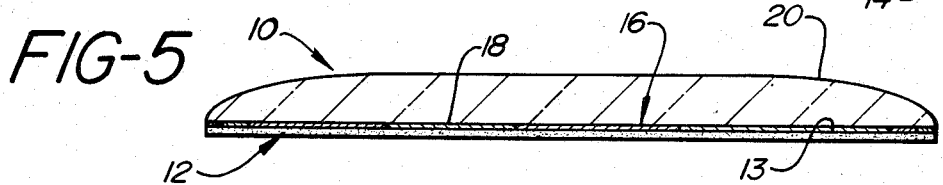

SUBSTRATELESS DECORATIVE EMBLEM AND METHOD OF MAKING

BACKGROUND OF THE INVENTION

This invention relates to decorative emblems and the like and methods for their manufacture, and more particularly to capped emblems having decorative indicia printed directly onto an adhesive layer and methods for their manufacture.

Decorative plaques and emblems are widely used throughout a number of industries, including the automotive and appliance industry. Many of these decorative emblems are formed on metal or plastic substrates onto which a liquid plastic resin is cast. The plastic resin cures to form a convex or positive meniscus-shaped cap over the substrate which gives a lens effect to the printed decorative indica on the substrate. Such emblems are conventionally adhered to their intended surface, such as an automobile or appliance body, utilizing a pressure sensitive adhesive coated on the back of the emblem substrate.

For example, Waugh, U.S. Pat. No. 4,100,010, discloses a method for the manufacture of plastic-capped decorative emblems which utilizes a flat, decorated foil substrate which can be either metal, paper, or plastic. Onto this decorated foil substrate, a liquid plastic resin is cast which flows to the peripheral side walls of the substrate and forms a positive meniscus or lens cap over the substrate. Likewise, Reed, U.S. Pat. No. 4,259,388, also describes a plastic-capped medallion which is formed on a flexible plastic substrate. Both Reed and Gilleo et al, U.S. Pat. No. 4,409,264, describe the use of a non-wetting material or so-called low surface energy dams to confine the flow of liquid plastic resin during casting.

However, the need for thin metal or plastic substrates to provide a surface for printing the decorative indicia and for supporting the cap poses a number of problems in the manufacture of such decorative emblems. The cost of such substrates represents a significant portion of the cost of the emblem. Typically, such substrates have an adhesive backing and are carried on a release liner or other support sheet. The individual emblems are formed by a die cutting operation, termed "kiss cutting", where the substrate is cut by the die but the underlying support sheet is not. A considerable portion of the substrate material must then be stripped off of the support sheet ("weeding") and discarded as scrap. This weeding operation introduces a significant labor and time expense to the manufacturing process in addition to producing large amounts of scrap.

Such die cutting operations, as well as embossing of the substrate, may also cause deformation of the substrate or a burring of the edges of the cut out substrates. Such deformation and burred edges introduce problems during the casting of liquid plastic resin onto the substrate and may cause overflow of the resin over the edges of the substrate. Also, kiss cutting sometimes accidently results in partial severing of the underlying support sheet. If that support sheet is held down by vacuum as in Waugh U.S. Pat. No. 4,100,010, then, during resin casting the vacuum may "pull at" the resin through the severed support sheet, causing overflow.

Finally, deformation and curling of the substrate during curing of the plastic resin may also occur because of differences in expansion and contraction rates of the plastic resin and substrate material. For example, as the plastic resin cures, some shrinkage may occur which causes substrate curling.

Accordingly, the need exists in the art for a decorative emblem and method of manufacture which avoids the problems of the prior art and yet which is relatively inexpensive to manufacture.

SUMMARY OF THE INVENTION

The present invention provides a plastic-capped decorative emblem and process of manufacture in which decorative indicia are printed directly onto an adhesive layer. According to one aspect of the present invention, a substrateless decorative emblem is made by the steps of providing a layer of a pressure sensitive adhesive on a support sheet. In one embodiment, a raised annular boundary is formed on one surface of the pressure sensitive adhesive to form at least one enclosed area thereon and the pressure sensitive adhesive surface within the enclosed area is then treated to render the upper surface of the adhesive tack free and suitable for silk screening or otherwise printing directly on the treated upper surface. In another embodiment, the upper surface of the pressure sensitive adhesive is treated to render it tack-free and, then, raised annular boundaries are formed to create at least one enclosed area to be decorated.

The treated upper surface of the adhesive is then decorated by silkscreening or otherwise printing background colors and/or indicia thereon. A measured amount of a curable liquid plastic resin may be cast onto the decorated surface and flows to the edge of the raised annular boundary. In the preferred embodiment, the resin forms a positive meniscus over the decorated area without overflowing the raised annular boundary. The resin is then cured and hardened to provide a substrateless decorative emblem having a plastic lens cap. Alternatively, a relatively flat cap may be applied by flow coating, spraying or laminating.

Preferably, the emblem assembly also includes a release liner. Thus, a preferred method of forming the decorative emblem of the present invention includes providing a layer of pressure sensitive adhesive supported on a release liner. The adhesive may be applied to the release liner in a conventional manner such as by spraying or roll coating. A plurality of emblem designs having raised annular boundaries is formed, preferably by attaching a cover sheet having a plurality of cut-outs in the shape of the emblem design. After the emblems have been formed and the plastic caps cured, this sheet, now bearing a plurality of emblems, may be shipped to the user where the individual emblem may be readily peeled off of the release liner and are ready to be adhered to an intended surface such as the surface of an automobile body or applicance. The raised boundary formed by the cut edges of the cover sheet acts as a knife edge of sorts such that when the emblem is peeled from the assembly, the underlying adhesive will break sharply at those edges resulting in an emblem having crisp edges. A die cutting operation can also be used to separate individual emblems (with release liner attached) from the overall assembly.

The present invention thus provides a decorative emblem without the need for the metal, plastic, or paper substrate required by prior art emblems and without the concomitant problems associated with forming and curing such emblems. Accordingly, it is an object of the present invention to provide a substrateless decorative emblem and process of manufacture. This, and other objects and advantages of the invention, will become apparent from the following detailed description, the accompanying drawings, and the appended claims.

BRIEF DESCRIPTION OF THE DRAWINGS

FIG. 1 is a cross-sectional view of an emblem produced by the process of the present invention—as die cut from the assembly;

FIG. 2 is an exploded perspective view in partial section of the decorated layer of pressure sensitive adhesive with cover sheet thereon;

FIG. 3 is a cross-sectional view of the emblem prior to casting of the plastic resin;

FIG. 4 is a cross-sectional view of the emblem assembly the plastic resin has been cast.

FIG. 5 is a cross-sectional view of an emblem produced by the process of the present invention—as peeled from the assembly of FIG. 4.

DETAILED DESCRIPTION OF THE PREFERRED EMBODIMENTS

FIGS. 1 and 5 illustrate in cross section substrateless decorative emblems made in accordance with the process of the present invention. FIG. 1 illustrates the situation which exists when the emblem is die cut from the assembly and the release liner remains on the back of each individual emblem until the emblem is put in use. FIG. 4, then, illustrates the situation which exists when a plurality of emblems are located on the release liner until peeled off, producing an emblem ready for use as shown in FIG. 5. Emblem 10 has a layer of pressure sensitive adhesive 12 having an upper and a lower surface. Pressure sensitive adhesive 12 can be any of a number of commercially available adhesives such as, for example, an acrylic pressure sensitive adhesive. The lower surface of adhesive 12 is adhered to a release liner 14. Liner 14 is preferably coated with a release material such as a silicone-based polymer which permits ready removal of emblem 10 when it is desired to adhere the emblem to an intended substrate such as an automobile body, appliance, or the like.

The upper surface 13 of adhesive 12 has been treated, as explained in further detail below, to render it tack free. As shown in the figures, a non-tacky surface 16 covers the upper surface of adhesive 12. Non-tacky surface 16 is preferably a clear lacquer one, but may also be a particle layer (such as talc or mica). Alternatively, a thin bright metallic layer, approximately 0.0001 inch thick or less, may be applied by hot stamping or spray metallizing, and serves to provide a bright or colored background for indicia 18 printed thereon. Indicia 18 may be any desirable decoration including words, numbers, symbols, pictures, or combinations thereof. Adhesive 12 may itself be colored, by any number of means, to serve as a background for indicia 18.

In the preferred embodiment, a cured, clear plastic lens cap 20 overlies and encapsulates indicia 18. As can be seen from FIGS. 1 and 5, the edges of lens caps 20 are contiguous with the layer of adhesive 12, and form a positive-shaped meniscus. This meniscus contributes to the lens effect of cap 20, enhancing the beauty of the printed indicia 18 while at the same time providing a tough, weather-resistant protective covering. Cap 20 may be formed of any castable plastic resin which is curable to a clear, tough compound. Preferably, a two-part polyurethane resin is used; although, other castable plastics may also be used. Such resins may be cured by either heat or exposure to ultraviolet or other radiation.

Referring now to FIGS. 2, 3, and 4, the substrateless decorative emblem of the present invention is preferably produced by the following steps. Initially, a layer of pressure sensitive adhesive 12 is coated onto release liner 14. Adhesive 12 may be applied to liner 14 by any suitable means such as by spraying or roll or dip coating. Preferably, adhesive layer 12 is applied in a thickness of from between about 0.002 to 0.010 inches.

A raised annular boundary is formed on the upper surface 13 of adhesive 12 forming an enclosed area thereon. The upper surface 13 is then treated, as desribed in further detail below, to render it tack free and suitable for printing directly on the treated surface. In a preferred embodiment of the invention as illustrated in FIGS. 2, 3, and 4, the raised annular boundary is formed by laminating a cover sheet 22 over adhesive surface 12.

As shown, one or more areas 24 of cover sheet 22 have been removed, such as by die cutting, to leave the corresponding area or areas of adhesive 12 exposed. The periphery of cut out areas 24 of cover sheet 22 correspond to the final shape of emblems 10 which are produced. Areas 24 may be circular, oval, square, rectangular, or any other desired shape. Cover sheet 22 may be of metal, cardboard, paper, or plastic. However, it is preferred that cover sheet 22 be of a nonabsorbing material or be treated to be nonabsorbing. Suitable plastics include styrene or polyester having a thickness of approximately 0.004 to 0.008 inches.

In a preferred embodiment, cover sheet 22 is treated to render its surface substantially nonwetting to the liquid plastic resin which is to be cast. Suitable treating agents, which may be applied to cover sheet 22 either prior to or after areas 24 have been removed, include fluorocarbon compounds such as polytetrafluoroethylene and silicones. A preferred treating agent for a polyester cover sheet comprises a mixture of polytetrafluoroethylene and Hypalon (trademark of duPont). Hypalon, which is a chlorinated rubber material, improves the adhesion of the treating agent to the polyester substrate and increases the ductility of the coating. The treating agent may be applied in any suitable manner such as by screen printing, spraying, or roll coating.

The exposed areas of adhesive 12 are then treated to render the upper surface 13 of the adhesive tack free and suitable for printing indicia 18 directly thereon. The lower surface of adhesive 12 remains tacky so that the finished article may be adhered to an intended surface. The treatment of upper surface 13 of adhesive 12 to render it tack free may be accomplished by a number of different procedures. Preferably, upper surface 13 may be overcoated with a clear or colored lacquer which forms non-tacky layer 16 and seals the upper surface of the adhesive. Alternatively, upper surface 13 may be dusted with a fine powder of inert particles such as mica.

In yet another alternative procedure, a bright metallic surface may be applied to upper surface 13. This can be accomplished by applying a bright metal hot stamp foil to upper surface 13 by means of a pressure roll or the like. The foil is accompanied by a carrier film which is then stripped away leaving bright metal non-tacky surface 16. A metallic non-tacky surface may have a silver or gold color, or other colors may be used as desired. The overall thickness of a bright metallic surface is desirably 0.001 inches or less.

Once upper surface 13 of adhesive layer 12 has been rendered tack free, any suitable indicia 18 may be printed directly thereon. These indicia may include letters, numbers, words, symbols, pictures, or other decoration. The printing may be accomplished by any of a number of printing techniques which are known in the art, including silk screen printing. Adhesive layer 12 may itself be colored by the addition of suitable pigment or dye to the composition. If layer 12 is already colored, the need for printing a colored background is eliminated. Likewise, if layer 12 is clear, areas of the upper surface may be left undecorated by indicia 18 so that when applied to a substrate (such as a chrome plated surface) the color or brightness of the substrate shows through in those areas. After printing, a liquid plastic resin is cast onto the decorated surface and flows to the sides of cover sheet 22 which define open area 24. In the preferred embodiment, the amount of liquid resin applied is controlled so that the resin forms a positive meniscus but does not overflow onto the cover sheet 22. As mentioned, it may also be controlled so as to produce a relatively flat cap should the lens not be desired. Also as preferred, the nonwetting fluorocarbon coating which has previously been applied aids in controlling the flow of plastic. Apparatus suitable for performing the casting operation is more fully described in Waugh, U.S. Pat. No. 4,100,010, the disclosure of which is hereby incorporated by reference.

The plastic resin utilized is preferably a clear thermosetting material which is resistant to abrasion and impact. A number of plastics can be used for this purpose, but one which is particularly advantageous is an impact-resistant polyurethane. Polyurethanes useful in the practice of the present invention are two-part compositions which are the reaction product of a glycol, such as a polyether or polyester glycol, and an aliphatic diisocyanate.

The cast plastic resin is cured or otherwise hardened to form a lens cap 20. The resin is preferably cured by heating or ultraviolet radiation. However, depending on the particular composition utilized, other methods such as radio frequency heating, hot air drying, or even the heat of an exothermic curing reaction may be utilized.

The process described above is preferably used to form a sheet-sized assembly having a plurality of emblems on it. That assembly may, then, be sent in sheet form to the user. The user will peel individual emblems from the assembly at the time of use. As mentioned previously, the edges of cover sheet 22 surrounding each individual emblem act as a knife edge of sorts to sharply cut the adhesive layer as the capped, decorated emblem, as shown in FIG. 5, is separated from the release liner. The polyurethane cap has firmly bonded to the indicia bearing adhesive and the capped emblem is, thus, cleanly separate from the assembly by this peeling procedure.

In an alternative embodiment, individual emblems may be die-cut from the assembly. In that instance, it is not necessary to use a cover sheet 22 and other methods may be used to form the raised boundary. These include the methods taught in Reed, U.S. Pat. No. 4,259,388, and Gilleo, U.S. Pat. No. 4,409,264, which are incorporated herein by reference. Likewise, a raised boundary may be formed by an embossing operation. In this embodiment, it is desirable to render the upper adhesive surface tack-free prior to formation of the raised boundaries. The remaining steps are, then, the same as in the preferred embodiment. After die cutting, the individual embodiment emblems will have the cross-section shown in FIG. 1.

In either embodiment, a unique substrateless (i.e. meaning that it has no metal or plastic foil substrate as such) decorative emblem is produced. That emblem may be used in areas of traditional emblem use, such as on automobiles and appliances. It may also be used in a number of areas where decalcomania find use.

While the invention has been described in detail and by reference to specific embodiments thereof, it will be apparent that numerous modifications and variations are possible without departing from the scope of the invention, which is defined in the appended claims.

What is claimed is:

1. A method of making a substrateless decorative emblem comprising the steps of:
   (a) providing a layer of pressure sensitive adhesive,
   (b) forming a raised annular boundary on a first surface of said layer of pressure sensitive adhesive to form an enclosed area thereon,
   (c) treating said first surface within said enclosed area of pressure sensitive adhesive to render said first surface tack free and suitable for printing directly on the treated surface,
   (d) decorating said treated surface by printing indicia directly thereon,
   (e) casting a curable liquid plastic resin onto said treated surface so that it flows to the edge of said raised annular boundary, and
   (f) curing said resin to harden it and provide substrateless decorative emblems having a plastic cap.

2. The method of claim 1 in which said layer of pressure sensitive adhesive is supported on a release liner.

3. The method of claim 2 wherein a measured amount of said curable liquid plastic is cast onto said treated surface so that it flows to the edge of said raised annular boundary and forms a positive meniscus without flowing over said boundary.

4. The method of claim 3 in which said raised annular boundary is formed by laminating a cover sheet to said first surface of said layer of pressure sensitive adhesive, said cover sheet having at least one open area thereon which forms said annular boundary.

5. The method of claim 4 in which said cover sheet has a plurality of open areas arranged in a predetermined spaced pattern.

6. The method of claim 5 in which said cover sheet is coated with a material which renders it poorly wetting with respect to said liquid plastic resin.

7. The method of claim 6 in which said coating material is selected from the group consisting of fluorocarbons and silicones.

8. The method of claim 4 including the steps of peeling said decorative emblem from said release liner and adhering it to an intended surface.

9. The method of claim 1 in which said treating step includes applying a lacquer over said enclosed area of said pressure sensitive adhesive.

10. The method of claim 1 in which said treating step includes dusting said enclosed area of said pressure sensitive adhesive with a powdered material.

11. The method of claim 10 in which said powdered material is mica.

12. The method of claim 1 in which said treating step includes applying a metallic surface to said enclosed area of said pressure sensitive adhesive.

13. The method of claim 12 wherein said metallic surface is produced by hot stamping a metal foil thereon.

14. A method of making a substrateless decorative emblem comprising the steps of:
- (a) providing a layer of pressure sensitive adhesive on a release liner,
- (b) treating the upper surface of said pressure sensitive adhesive to render it tack free and suitable for printing directly on the treated surface,
- (c) forming at least one raised annular boundary on said treated surface to form at least one enclosed area thereon,
- (d) decorating said treated surface within said enclosed area by printing indicia directly thereon,
- (e) casting a curable liquid plastic resin onto said treated surface so that it flows to the edge of said raised annular boundary, and
- (f) curing said resin to harden it and provide substrateless decorative emblems having a plastic cap.

15. The method of claim 14 wherein said raised annular boundary is formed by an embossing operation.

16. The method of claim 14 wherein said raised annular boundary is formed by creating a low surface energy dam on said upper surface.

17. The method of claim 14 including the step of blanking out said decorative emblem by die cutting around its periphery so as to produce an individual substrateless decorative emblem having a release liner.

18. The method of claim 17 further including the steps of removing said emblem from said release liner and applying it to the intended surface.

* * * * *